United States Patent
Agarwal et al.

(10) Patent No.: US 10,305,971 B2
(45) Date of Patent: May 28, 2019

(54) SELF-RECOVERABLE MULTITENANT DISTRIBUTED CLUSTERED SYSTEMS

(71) Applicant: International Business Machines Corporation, Armonk, NY (US)

(72) Inventors: Anjali Agarwal, Kolkata (IN); Rachit Arora, Bangalore (IN); Rakhi S. Arora, Bangalore (IN); Dharmesh K. Jain, Bangalore (IN); Shrinivas S. Kulkarni, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/879,744

(22) Filed: Jan. 25, 2018

(65) Prior Publication Data
US 2018/0167448 A1    Jun. 14, 2018

Related U.S. Application Data

(63) Continuation of application No. 15/376,829, filed on Feb. 13, 2016.

(51) Int. Cl.
*H04L 29/08* (2006.01)
*H04L 29/06* (2006.01)
(Continued)

(52) U.S. Cl.
CPC .......... *H04L 67/1002* (2013.01); *H04L 41/08* (2013.01); *H04L 41/12* (2013.01);
(Continued)

(58) Field of Classification Search
CPC ............................. H04L 41/08; H04L 41/12
See application file for complete search history.

(56) References Cited

U.S. PATENT DOCUMENTS 5,708,776 A  *  1/1998  Kikinis .............. G06F 11/1417
                                                                   714/10
5,805,785 A  *  9/1998  Dias .................... G06F 11/1438
                                                                   714/20
(Continued)

FOREIGN PATENT DOCUMENTS

CN          103595572 A       2/2014
CN          104111878 A      10/2014

OTHER PUBLICATIONS

"HDFS High Availability Using the Quorum Journal Manager", The Apache Software Foundation, Hadoop, https://hadoop.apache.org/docs/r2.7.1/hadoop-project-dist/hadoop-hdfs/HDFSHighAvailabilityWithQJM.html, retrieved from the Internet Aug. 24, 2016, 16 pages.

(Continued)

*Primary Examiner* — Lashonda T Jacobs
(74) *Attorney, Agent, or Firm* — Francis Lammes; Stephen J. Walder, Jr.; Robert C. Bunker

(57) ABSTRACT

A mechanism is provided for automatically recovering one or more distributed cluster nodes on a host system. Responsive to the host system recovering, restoring, or restarting, a set of distributed clustered systems affected due to the reboot of the host system and details associated with each of the set of distributed clustered systems are identified. Using the details, a set of nodes that operate on the host system are identified. For each node: respective components and configurations are prepared; a heartbeat is initiated thereby causing the node to register with a cluster network and identify peers within their associated distributed clustered system; a determination is made as to whether the node has reestablished connection with its associated distributed clustered system; and, responsive to the node reestablishing (Continued)

connection with its associated distributed clustered system, service components are started on the node.

7 Claims, 4 Drawing Sheets

(51) Int. Cl.
    *H04L 12/24*     (2006.01)
    *H04L 12/703*     (2013.01)

(52) U.S. Cl.
    CPC .............. *H04L 45/28* (2013.01); *H04L 67/02* (2013.01); *H04L 67/42* (2013.01)

(56) References Cited

U.S. PATENT DOCUMENTS

| | | | | |
|---|---|---|---|---|
| 7,076,645 B2* | 7/2006 | Mittal | ................... | G06F 9/4405 713/1 |
| 7,185,076 B1* | 2/2007 | Novaes | ................. | G06F 9/5061 709/217 |
| 7,284,020 B2* | 10/2007 | Shitomi | ............. | G06F 11/1662 |
| 8,055,735 B2* | 11/2011 | Krishnappa | ............. | G06F 15/16 709/220 |
| 8,805,978 B1* | 8/2014 | Anthonisamy | ....... | G06F 9/5072 709/208 |
| 2002/0184555 A1* | 12/2002 | Wong | ................. | G06F 11/0709 714/4.1 |
| 2004/0103338 A1 | 5/2004 | Chalasani et al. | | |
| 2004/0153704 A1* | 8/2004 | Bragulla | ............. | G06F 11/0709 714/4.1 |
| 2008/0155333 A1* | 6/2008 | Brundidge | .......... | G06F 11/0727 714/36 |
| 2009/0150717 A1* | 6/2009 | Lee | ........................ | G06F 11/008 714/4.1 |
| 2009/0222812 A1* | 9/2009 | Nissen | .................... | G06F 16/10 717/173 |
| 2010/0185894 A1* | 7/2010 | Herta | .................. | G06F 11/1461 714/4.1 |
| 2011/0154092 A1* | 6/2011 | Dash | .................... | G06F 11/0709 714/2 |
| 2015/0019909 A1* | 1/2015 | Griffith | ............... | G06F 11/1458 714/15 |
| 2015/0058843 A1 | 2/2015 | Holler et al. | | |
| 2015/0074178 A1* | 3/2015 | Hong | .................. | H04L 67/1097 709/203 |
| 2015/0257081 A1* | 9/2015 | Ramanujan | ........... | H04L 45/125 370/329 |
| 2017/0339005 A1* | 11/2017 | Yuan | ...................... | H04L 43/00 |

OTHER PUBLICATIONS

Borthakur, Dhruba, "HDFS Architecture Guide", The Apache Software Foundation, https://hadoop.apache.org/docs/r1.2.1/hdfs_design.pdf, Copyright 2008 (month unknown), 13 pages.

Christensen, Ben, "Fault Tolerance in a High Volume, Distributed System", Netflix, Tech Blog, http://techblog.netflix.com/2012/02/fault-tolerance-in-high-volume.html, Feb. 29, 2012, 15 pages.

Patil, Vishal S. et al., "Hadoop Skeleton & Fault Tolerance in Hadoop Clusters", International Journal of Application or Innovation in Engineering & Management (IJAIEM), vol. 2, Issue 2, Feb. 2013, pp. 247-250.

List of IBM Patents or Patent Applications Treated as Related, Jan. 25, 2018, 2 pages.

* cited by examiner

SELF-RECOVERABLE MULTITENANT DISTRIBUTED CLUSTERED SYSTEMS

BACKGROUND

The present application relates generally to an improved data processing apparatus and method and more specifically to mechanisms for recovering a set of distributed clustered systems back to a normal state.

Distributed clustered systems are deployed on more than one host machine or node—each machine or node having one or more processors, memory, and (optionally) persistent storage, such as a hard disk, solid-state drive, or the like. The machines may be physical machines, virtual machines, Linux® containers, or the like. The machines or nodes are connected over a network, such as a physical network, virtual network, software defined network, or the like. Hadoop is one example of such a distributed clustered system, as the Hadoop processes are distributed over multiple machines or nodes, i.e. a cluster of machines or nodes.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment, a method, in a data processing system, is provided for automatically recovering one or more distributed cluster nodes on a host system. Responsive to the host system being recovering, restoring, or restarting, the illustrative embodiment identifies a set of distributed clustered systems affected due to the recovery, restoration, or restart of the host system and details associated with each of the set of distributed clustered systems. Using the details associated with the set of distributed clustered systems, the illustrative embodiment identifies a set of nodes that operate on the host system. For each node in the set of nodes, the illustrative embodiment prepares the node with respective components and configurations; initiates a heartbeat thereby causing the node to register with a cluster network and identify peers within their associated distributed clustered system; determines whether the node has reestablished connection with its associated distributed clustered system; and, responsive to the node reestablishing connection with its associated distributed clustered system, starts service components on the node.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Figure 1:
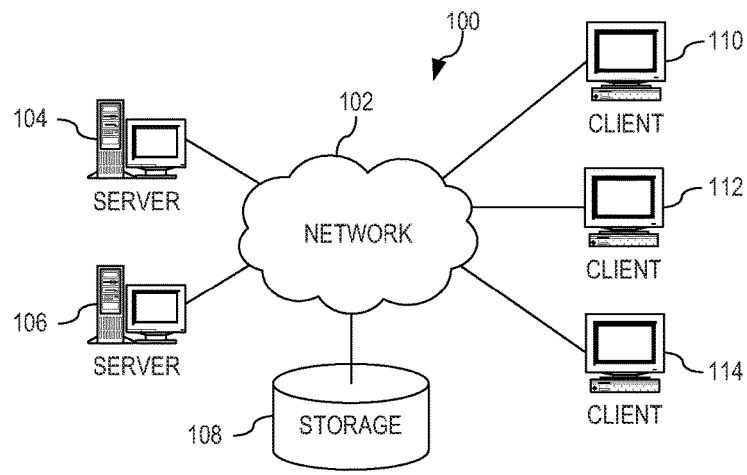
FIG. 1 is an example diagram of a distributed data processing system in which aspects of the illustrative embodiments may be implemented.

The illustrative embodiments provide mechanisms for, upon recovery, restoration, restart, or the like of the host machine, recovering a set of distributed clustered system back to normal state. As noted above, distributed clustered systems, like Hadoop, includes multiple nodes distributed across multiple physical host machines. In case where distributed clustered systems are multitenant, nodes belonging to one or more distributed clustered systems may share a same physical host machine and, at the same time, different nodes of a same cluster may be distributed across different host machines. In an event when a host machine fails to operate or goes down, one or more distributed clustered systems may be affected. Upon recovery, restoration, restart, or the like, of the host machine hosting the one or more distributed clustered systems, bringing all the affected nodes associated with the one or more distributed clustered systems on the host machine back to a normal state is a tedious process involving a multitude of steps. This is not just applicable to Hadoop distributed clustered systems but any distributed clustered system.

Furthermore, in large data centers or in systems such as a cloud services system there is a possibility that thousands of host machines are recovered, restored, restarted, or the like, at almost a same time, which multiplies the effort of bringing the nodes belonging to thousands of distributed clustered systems back to their proper state. However, as each host system is recovered, restored, restarted, or the like, the illustrative embodiment provide for bringing all the affected nodes associated with the one or more distributed clustered systems on each host machine back to a normal state.

Therefore, if a host machine hosting multiple distributed clustered systems goes down, then multiple distributed clustered systems may be affected. Some distributed clustered systems may be totally disrupted if a master node is affected, while (because of the master node being down) other distributed clustered systems may be functioning in limited capacity because of one or more slave nodes being down. The illustrative embodiments provide for restoring one or more nodes associated with one or more distributed clustered systems on a host machine driven by an automatic cluster recovery mechanism. It is the automatic cluster recovery mechanism's responsibility to bring back not only the nodes associated with a cluster, such as a master node, slave node, edge node, or the like, but also any services executed by the one or more nodes when the physical host on which these nodes were residing goes down.

Existing techniques mainly deal with such scenarios by making components highly available or by making the components fault tolerant—at software or hardware level. Some also provide way to recover by executing certain manual steps. The proposed embodiments differ from where cluster nodes are made self-aware of their own state and the state of their host. In addition, the host infrastructure is made aware of what components of the distributed clustered systems were to be hosted. Thus, with this unique combination, as the state of the host machine changes, the contained components (nodes) of the cluster react accordingly. Recovery from a host failure is one such reactive behavior of the cluster nodes, which may include but not limited to reinstating its state to a state when the failure occurred.

Before beginning the discussion of the various aspects of the illustrative embodiments, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on general-purpose hardware, software instructions stored on a medium such that the instructions are readily executable by specialized or general-purpose hardware, a procedure or method for executing the functions, or a combination of any of the above.

The present description and claims may make use of the terms "a," "at least one of," and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

Moreover, it should be appreciated that the use of the term "engine," if used herein with regard to describing embodiments and features of the invention, is not intended to be limiting of any particular implementation for accomplishing and/or performing the actions, steps, processes, etc., attributable to and/or performed by the engine. An engine may be, but is not limited to, software, hardware and/or firmware or any combination thereof that performs the specified functions including, but not limited to, any use of a general and/or specialized processor in combination with appropriate software loaded or stored in a machine readable memory and executed by the processor. Further, any name associated with a particular engine is, unless otherwise specified, for purposes of convenience of reference and not intended to be limiting to a specific implementation. Additionally, any functionality attributed to an engine may be equally performed by multiple engines, incorporated into and/or combined with the functionality of another engine of the same or different type, or distributed across one or more engines of various configurations.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

Figure 2:
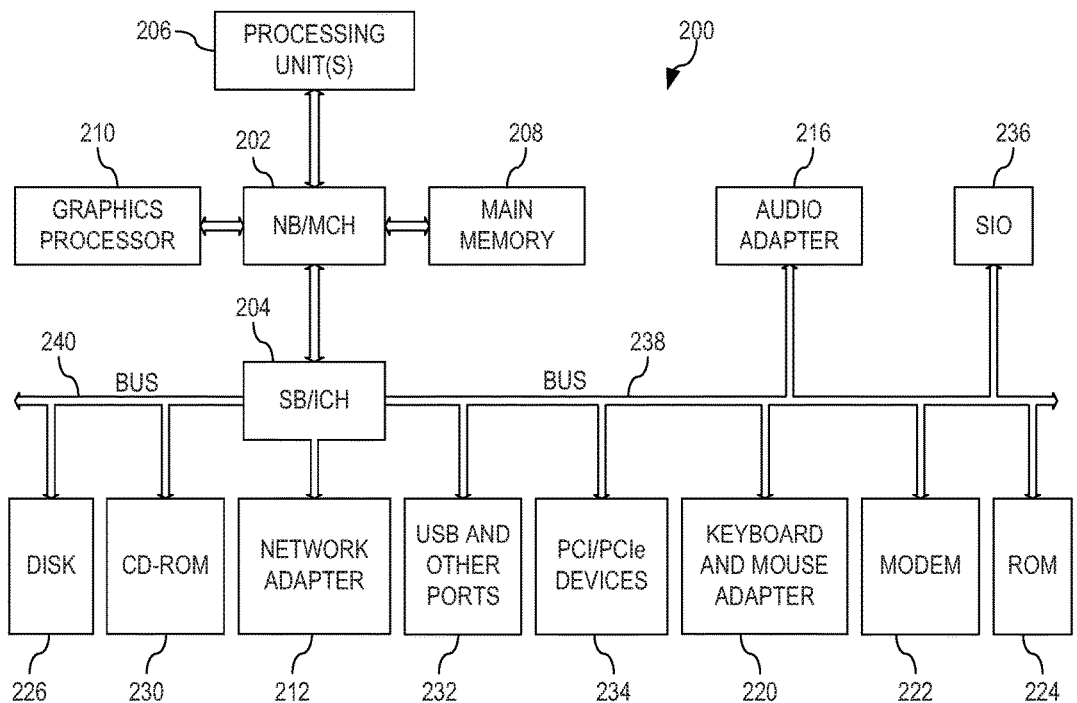
FIG. 2 is an example block diagram of a computing device in which aspects of the illustrative embodiments may be implemented.

Thus, the illustrative embodiments may be utilized in many different types of data processing environments. In order to provide a context for the description of the specific elements and functionality of the illustrative embodiments, FIGS. 1 and 2 are provided hereafter as example environments in which aspects of the illustrative embodiments may be implemented. It should be appreciated that FIGS. 1 and 2 are only examples and are not intended to assert or imply any limitation with regard to the environments in which aspects or embodiments of the present invention may be implemented. Many modifications to the depicted environments may be made without departing from the spirit and scope of the present invention.

FIG. 1 depicts a pictorial representation of an example distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

As shown in FIG. 1, one or more of the computing devices, e.g., server 104, may be specifically configured to implement automatically recovering nodes of a distributed clustered system on a host machine upon recovery, restoration, restart, or the like of the host machine without the need of intervention of any external agent or stimuli. The configuring of the computing device may comprise the providing of application specific hardware, firmware, or the like to facilitate the performance of the operations and generation of the outputs described herein with regard to the illustrative embodiments. The configuring of the computing device may also, or alternatively, comprise the providing of software applications stored in one or more storage devices and loaded into memory of a computing device, such as server 104, for causing one or more hardware processors of the computing device to execute the software applications that configure the processors to perform the operations and generate the outputs described herein with regard to the illustrative embodiments. Moreover, any combination of application specific hardware, firmware, software applications executed on hardware, or the like, may be used without departing from the spirit and scope of the illustrative embodiments.

It should be appreciated that once the computing device is configured in one of these ways, the computing device becomes a specialized computing device specifically configured to implement the mechanisms of the illustrative embodiments and is not a general-purpose computing device. Moreover, as described hereafter, the implementation of the mechanisms of the illustrative embodiments improves the functionality of the computing device and provides a useful and concrete result that facilitates automatically recovering a distributed cluster node running on a host machine upon recovery, restoration, restart, or the like of the host machine without the need of intervention of any external agent or stimuli.

As noted above, the mechanisms of the illustrative embodiments utilize specifically configured computing devices, or data processing systems, to perform the operations for automatically recovering a distributed cluster node running on a host machine upon recovery, restoration, restart, or the like of the host machine without the need of intervention of any external agent or stimuli. These computing devices, or data processing systems, may comprise various hardware elements that are specifically configured, either through hardware configuration, software configuration, or a combination of hardware and software configuration, to implement one or more of the systems/subsystems described herein. FIG. 2 is a block diagram of just one example data processing system in which aspects of the illustrative embodiments may be implemented. Data processing system 200 is an example of a computer, such as server 104 in FIG. 1, in which computer usable code or instructions implementing the processes and aspects of the illustrative embodiments of the present invention may be located and/or executed so as to achieve the operation, output, and external effects of the illustrative embodiments as described herein.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows 7®. An object-oriented programming system, such as the Java™ programming system, may run in conjunction with the operating system and provides calls to the operating system from Java™ programs or applications executing on data processing system 200.

As a server, data processing system 200 may be, for example, an IBM eServer™ System p® computer system, Power™ processor based computer system, or the like, running the Advanced Interactive Executive (AIX®) operating system or the LINUX® operating system. Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

As mentioned above, in some illustrative embodiments the mechanisms of the illustrative embodiments may be implemented as application specific hardware, firmware, or the like, application software stored in a storage device, such as HDD 226 and loaded into memory, such as main memory 208, for executed by one or more hardware processors, such as processing unit 206, or the like. As such, the computing device shown in FIG. 2 becomes specifically configured to implement the mechanisms of the illustrative embodiments and specifically configured to perform the operations and generate the outputs described hereafter with regard to automatically recovering a distributed cluster node running on a host machine upon recovery, restoration, restart, or the like of the host machine without the need of intervention of any external agent or stimuli.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. In addition, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

Figure 3:
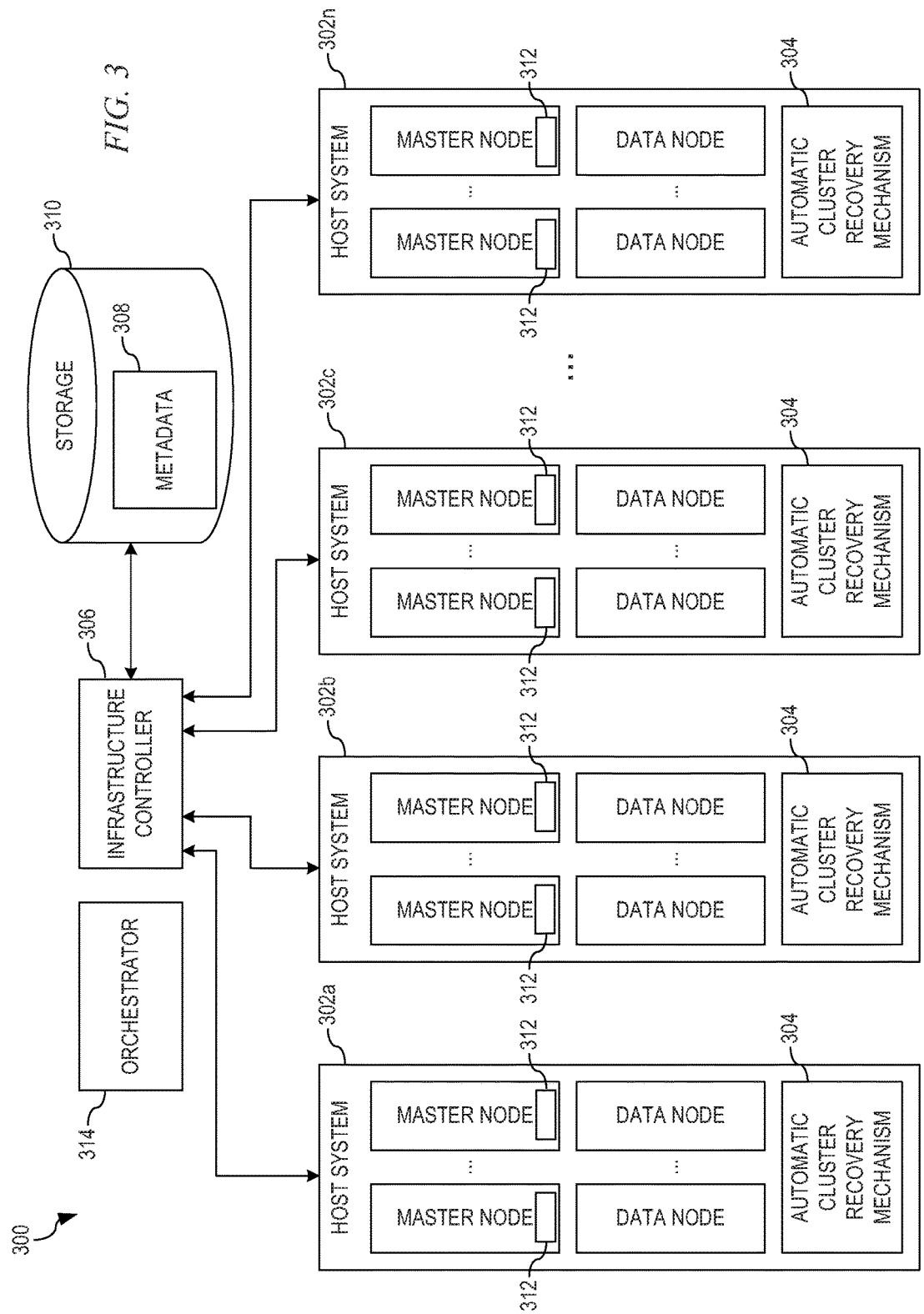
FIG. 3 depicts a functional block diagram of an automatic cluster recovery mechanism that, upon recovery of the host machine, causes the distributed clustered system on the host matching to automatically recover themselves and bring their state back to normal in accordance with an illustrative embodiment.

FIG. 3 depicts a functional block diagram of an automatic cluster recovery mechanism that, upon recovery, restoration, restart, or the like of the host machine, causes the distributed clustered system on the host matching to automatically recover themselves and bring their state back to normal in accordance with an illustrative embodiment. Data processing system 300, which is a data processing system such as data processing system 100 of FIG. 1, comprises a set of host machines 302a, 302b, 302c, . . . , 302n that form a shared infrastructure on which multiple distributed clustered systems reside. Each distributed clustered system comprises a set of nodes, including, for example, one or more master nodes and one or more other nodes, such as data nodes, edge nodes, or the like, which may reside on one host machine, such as host machine 302a, or, typically, across multiple host machines. For example, for a particular distributed clustered system that comprises three data nodes, a master node resides on host machine 302a and associated data nodes reside on host machine 302a, 302b, and 302n. The master node and each of the data nodes are virtual machines, containers, bare metal machines, or the like, which, in accordance with the illustrative embodiments, operate on an associated host machine, although other implementations are possible without departing from the spirit and scope of the present invention.

In one example, although the illustrative embodiments are not limited to such numbers, each of host machines 302a, 302b, 302c, . . . , 302n include two master nodes, each associated with a different distributed clustered system, and up to six data nodes, which may be associated with six different distributed clustered systems on other host machines. In an event that one of the host machines, for example host machine 302b, malfunctions, accidentally reboots, or the like, such that host machine 302b has to recover, restore, restart, or the like, the two master nodes and six data nodes operating on host machine 302b are affecting up to eight distributed clustered systems, two of which are completely down (due to the master nodes) and six may be partially down (due to the six data nodes). After a time period, host machine 302b recovers, restores, restarts, or the like, either through automated means or with manual intervention. However, currently, unless manual intervention intercedes, the distributed clustered system associated with the two master nodes and six data nodes will still be affected even after host machine 302b is fully recovered, restored, restarted, or the like.

Accordingly, each host machine includes automatic cluster recovery mechanism 304. Utilizing host machine 302b as an example, in order to recover the distributed clustered systems affected (i.e. the two master nodes and the six data nodes in the example) residing on host machine 302b, automatic cluster recovery mechanism 304 initially sends a request to infrastructure controller 306 requesting an identification of a set of distributed clustered systems affected due to the reboot of host system 302b. Infrastructure controller 306 identifies the distributed clustered systems utilizing metadata 308 stored in storage 310. Upon automatic cluster recovery mechanism 304 receiving the identification of the distributed clustered systems affected due to the reboot of host system 302b, automatic cluster recovery mechanism 304 sends a request to infrastructure controller 306 requesting details about each distributed clustered system in the set of distributed clustered systems affected due to the reboot of host system 302b. Infrastructure controller 306 identifies the details about each distributed clustered system utilizing metadata 308. The details about each distributed clustered system may include a cluster identifier, cluster name, user credentials, public IP address, an installed services list, as well as, for each node in the cluster a node identifier, IP address, host name, node type, peer node IP address, or the like.

Upon automatic cluster recovery mechanism 304 receiving the details about each distributed clustered system, automatic cluster recovery mechanism 304 determines, from the distributed clustered system details, the a set of nodes (e.g. master nodes, data nodes, edge nodes, or the like) scheduled on host system 302b; what services being executed by each identified node; and which disks, volumes, data partitions, or the like, are being used by each identified node. For each identified node, automatic cluster recovery mechanism 304 prepares the node with its respective software components and configuration. In preparing the node with its respective software components and configuration, automatic cluster recovery mechanism 304 prepares different volumes required for the node with metadata information, data information, log directory information, or the like. A volume, in simplistic terms, is a file system or a folder in a host machine's file system that shows up as mounted file system in a virtual machine (VM) or container. The volumes differ based on the type of node, i.e. whether the node is a master node or a data node. Automatic cluster recovery mechanism 304 then attaches a portable internet protocol (IP) address to any master node. Automatic cluster recovery mechanism 304 then specifies all the volume information and IP ports for virtual machine or container use. Automatic cluster recovery mechanism 304 then starts each virtual machine or container and configures each virtual machine or container with peer details so that each virtual machine or container may communicate with associated virtual machines or containers.

Automatic cluster recovery mechanism 304 then starts any required prerequisite services depending upon the type of the node, i.e. whether the node is a master node or a data node. In one example, for a master node, automatic cluster recovery mechanism 304 may start a cluster manager and a cluster management agent, while, for a data node, automatic cluster recovery mechanism 304 starts only a cluster management agent. In another example, when there are multiple master nodes, automatic cluster recovery mechanism 304 starts an cluster manager for one master node and an cluster management agent for the other master node, while, for a data node, automatic cluster recovery mechanism 304 starts only an cluster management agent or nothing at all. In accordance with one illustrative embodiment, a cluster manager may be an Ambari server and a cluster management agent may be an Abmari agent.

Automatic cluster recovery mechanism 304 then causes the cluster manager/cluster management agent on each node to initiate a heartbeat to register with an associated network and identify peers within their associated distributed clustered system. For a data node, automatic cluster recovery mechanism 304 just starting the virtual machine or container and the cluster management agent registering with the associated network may be enough to reestablish the data node with its distributed clustered systems. Although, in some events, automatic cluster recovery mechanism 304 starting service components on the recovered data node through one of the master node's services may be required.

For a master node, the entire distributed clustered system associated with the master node will have been down and, in some such cases, other data nodes associated with the master node executing on good host machines, may have tried reaching the master node several times and, after a fixed time of failure attempting to join with the master node, may have gone down themselves. Hence, as part of the recovery of the master node, the master node's responsibility is to reach out to each of the other host systems having an associated data node and request the automatic cluster recovery mechanism 304 on those host systems to recreate and/or re-prepare those data nodes. Once all the data nodes are up and joined to their associated recovered master node, the automatic cluster recovery mechanism 304 starts associated service components on all the nodes, whether the node is a master node, data nodes, edge node, or the like.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Figure 4:
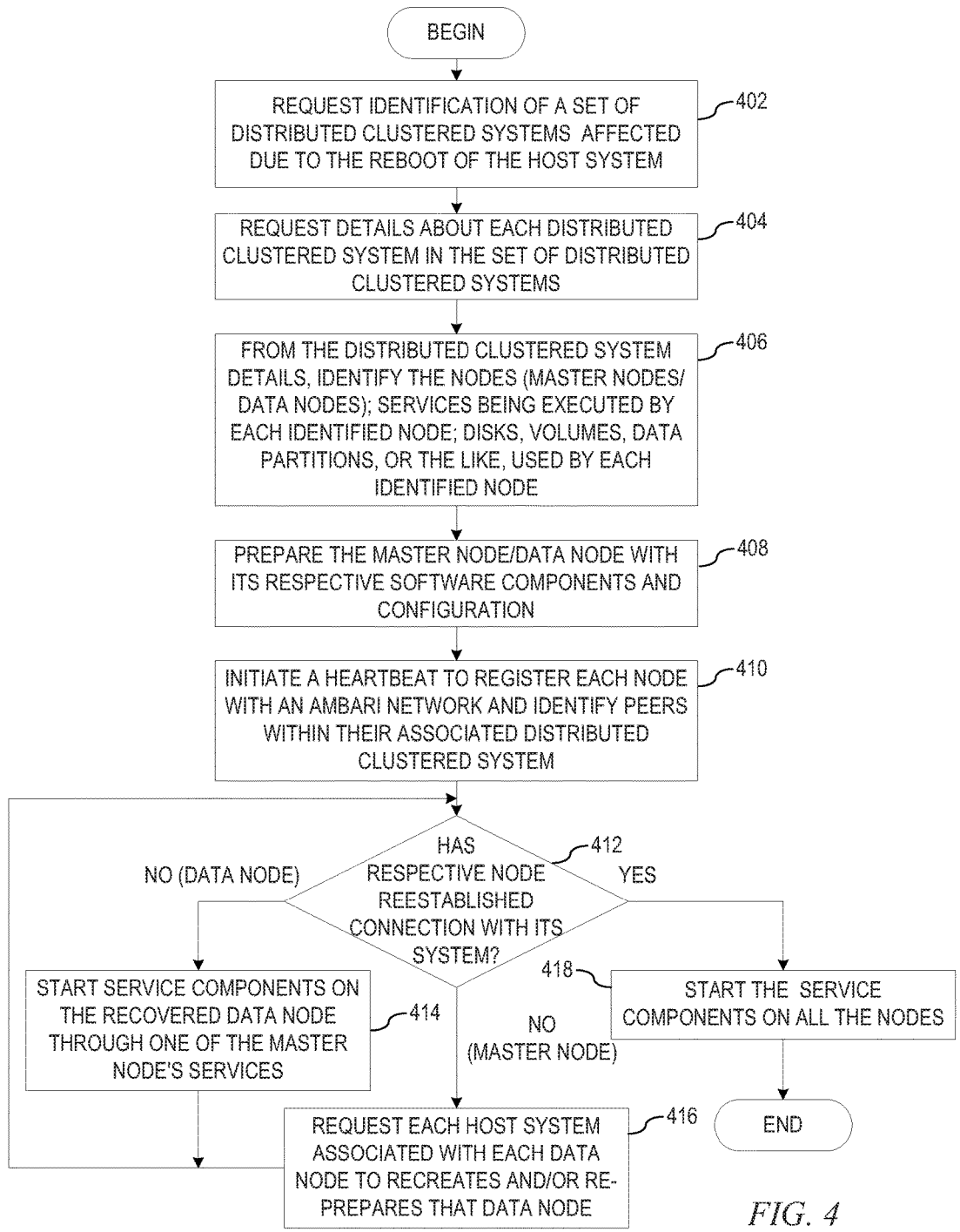
FIG. 4 depicts a flowchart of the operation performed by an automatic cluster recovery mechanism when a host machine is rebooted in a distributed clustered system in accordance with an illustrative embodiment.

FIG. 4 depicts a flowchart of the operation performed by an automatic cluster recovery mechanism when a host machine is recovered, restores, restarted, or the like, on which a distributed clustered system resides in accordance with an illustrative embodiment. As the operation begins, upon a host machine being recovered, restored, restarted, or the like due to, for example, a malfunction, accidentally reboot, or the like, an automatic cluster recovery mechanism, which is part of the boot strap process executed in rebooting the host machine, sends a request to an infrastructure controller for an identification of a set of distributed clustered systems affected due to the reboot of the host system (step 402). Upon the automatic cluster recovery mechanism receiving the identification of the distributed clustered systems affected due to the reboot of the host system, the automatic cluster recovery mechanism sends a request to an infrastructure controller requesting details about each distributed clustered system in the set of distributed clustered systems affected due to the recovery, restoration, restart, or the like, of the host system (step 404).

Upon the automatic cluster recovery mechanism receiving the details about each distributed clustered systems on the host machine, the automatic cluster recovery mechanism determines, from the distributed clustered system details, a set of nodes (e.g. master nodes, data nodes, edge nodes, or the like) scheduled on the host system; what services being executed by each identified node; and which disks, volumes, data partitions, or the like, are being used by each identified nodes (step 406). For each identified node, the automatic cluster recovery mechanism prepares the node with its respective software components and configuration (step 408). The automatic cluster recovery mechanism then causes a cluster manager/cluster management agent on each node to initiate a heartbeat to register with an associated network and identify peers within their associated distributed clustered system (step 410). The automatic cluster recovery mechanism then checks each node to determine whether the respective node has reestablished connection with its distributed clustered system (step 412). For a data node, the automatic cluster recovery mechanism starting the virtual machine or container and a cluster management agent registering with the associated network may be enough to reestablish connection the data node with its distributed clustered system. If at step 412 the data node has not reestablished connection with its distributed clustered system, then the automatic cluster recovery mechanism starts service components on the recovered data node through one of the master node's services (step 414), with the operation returning to step 412 thereafter.

For a master node, the entire distributed clustered system associated with the master node will have been down and, in some such cases, other data nodes associated with the master node executing on good host machines, may have tried reaching the master node several times and, after a fixed time of failure attempting to join with the master node, may have gone down themselves. Hence, if at step 412 the master node has not reestablished with each data node in its distributed clustered system, the automatic cluster recovery mechanism sends a request to an automatic cluster recovery mechanism each host system associated with each data node that has not reestablished with the master node so that the automatic cluster recovery mechanism on those host system recreates and/or re-prepares that data node (step 416), with the operation returning to step 412 thereafter. If at step 412 all nodes on the host system have reestablished with their respective data nodes, edge nodes, master nodes, or the like, the automatic cluster recovery mechanism starts the service components on all the nodes (step 418), with the operation terminating thereafter.

Figure 5:
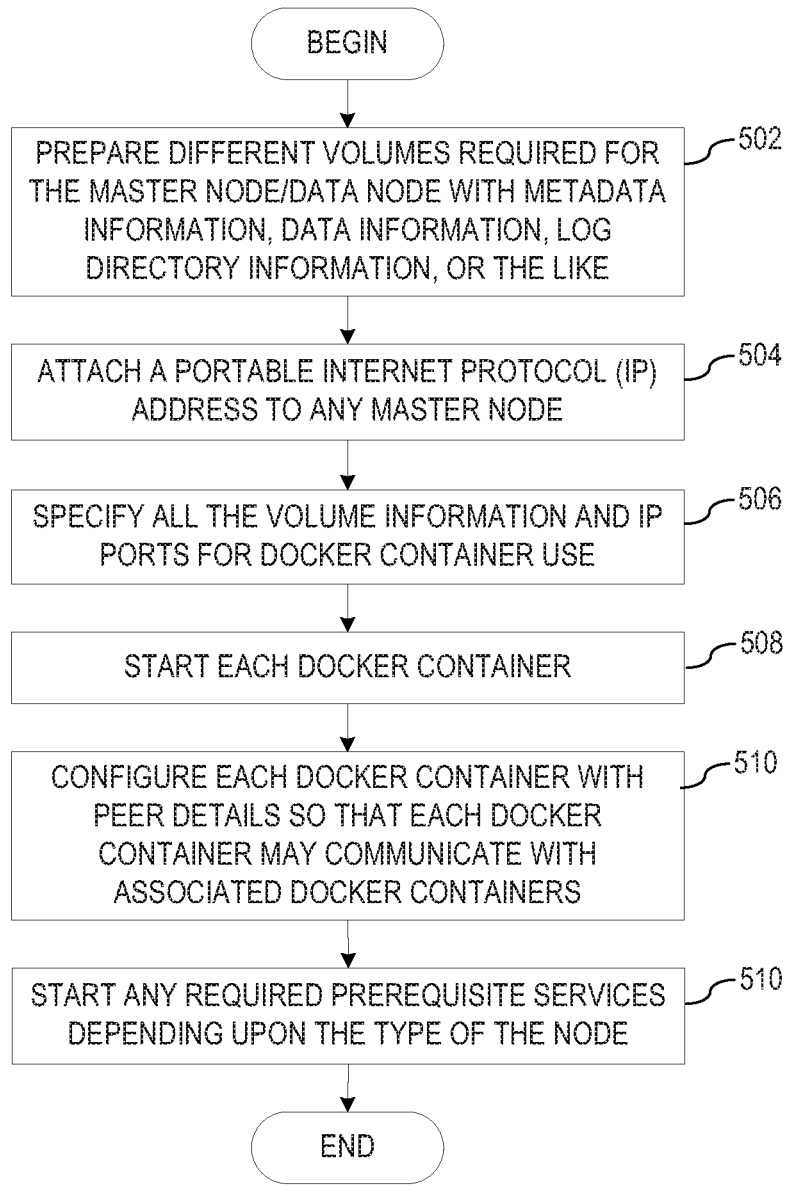
FIG. 5 depicts a flowchart of the operation performed by an automatic cluster recovery mechanism in preparing the master node/data node with its respective software components and configuration in accordance with an illustrative embodiment.

FIG. 5 depicts a flowchart of the operation performed by an automatic cluster recovery mechanism in preparing the master node/data node with its respective software components and configuration in accordance with an illustrative embodiment. As the operation begins, the automatic cluster recovery mechanism prepares different volumes required for the master node/data node with metadata information, data information, log directory information, or the like (step 502). The volumes differ based on the type of node, i.e. whether the node is a master node, a data node, an edge node, or the like. The automatic cluster recovery mechanism then attaches a portable internet protocol (IP) address to any master node (step 504). The automatic cluster recovery mechanism then specifies all the volume information and IP ports for virtual machine or container use (step 506). The automatic cluster recovery mechanism then starts each virtual machine or container (step 508) and configures each virtual machine or container with peer details so that each virtual machine or container may communicate with associated virtual machine or containers (step 510). The automatic cluster recovery mechanism then starts any required prerequisite services depending upon the type of the node (step 512), i.e. whether the node is a master node, a data node, an edge node, or the like. The operation ends thereafter.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Thus, the illustrative embodiments provide mechanisms for, upon recovery, restoration, restart, or the like, of the host machine, the distributed clustered systems within the distributed clustered system recover themselves and bring their state back to normal. If a host machine hosting multiple distributed clustered systems goes down, then multiple distributed clustered systems may be affected. Some distributed clustered systems may be totally disrupted if a master node is affected, while (because of master node being down) other distributed clustered systems may be functioning in limited capacity because of one or more slave nodes being down. The illustrative embodiments provide for an automatically healing cluster that heals itself driven by an automatic cluster recovery mechanism. It is the automatic cluster recovery mechanism's responsibility to bring back any cluster when any services on the cluster goes down, or bring back the cluster's slave node(s) and/or master nodes which are affected when the physical host on which these nodes were residing goes down. Thus, with this unique combination, as the state of the host machine changes, the contained components (nodes) of the cluster react accordingly. Recovery from a host failure is one such reactive behavior of the cluster nodes, which may include but not limited to reinstating its state to a state when the failure occurred.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a communication bus, such as a system bus, for example. The memory elements can include local memory employed during actual execution of the program code, bulk storage, and cache memories which provide temporary storage of at least some program code in order to reduce the number of times code must be retrieved from bulk storage during execution. The memory may be of various types including, but not limited to, ROM, PROM, EPROM, EEPROM, DRAM, SRAM, Flash memory, solid-state memory, and the like.

Input/output or I/O devices (including but not limited to keyboards, displays, pointing devices, etc.) can be coupled to the system either directly or through intervening wired or wireless I/O interfaces and/or controllers, or the like. I/O devices may take many different forms other than conventional keyboards, displays, pointing devices, and the like, such as for example communication devices coupled through wired or wireless connections including, but not limited to, smart phones, tablet computers, touch screen devices, voice recognition devices, and the like. Any known or later developed I/O device is intended to be within the scope of the illustrative embodiments.

Network adapters may also be coupled to the system to enable the data processing system to become coupled to other data processing systems or remote printers or storage devices through intervening private or public networks. Modems, cable modems and Ethernet cards are just a few of the currently available types of network adapters for wired communications. Wireless communication based network adapters may also be utilized including, but not limited to, 802.11a/b/g/n wireless communication adapters, Bluetooth wireless adapters, and the like. Any known or later developed network adapters are intended to be within the spirit and scope of the present invention.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method, in a data processing system comprising processor and a memory coupled to the processor, the memory comprising instructions that are executed by the processor to cause the processor to implement an automatic cluster recovery mechanism on a host system for automatically recovering one or more distributed cluster nodes on the host system, the method comprising:

responsive to the host system recovering, restoring, or restarting, identifying, by the automatic cluster recovery mechanism on the host system from an infrastructure controller external to the host system, a set of distributed clustered systems affected due to the recovery, restoration, or restart of the host system and details associated with each of the set of distributed clustered systems;

using the details associated with the set of distributed clustered systems, identifying, by the automatic cluster recovery mechanism, a set of nodes that operate on the host system; and for each node in the set of nodes:
preparing, by the automatic cluster recovery mechanism, the node with respective components and configurations;
initiating, by the automatic cluster recovery mechanism, a heartbeat thereby causing the node to register with a cluster network and identify peers within their associated distributed clustered system;
determining, by the automatic cluster recovery mechanism, whether the node has reestablished connection with its associated distributed clustered system; and
responsive to the node reestablishing connection with its associated distributed clustered system, starting, by the automatic cluster recovery mechanism, service components on the node.

2. The method of claim 1, wherein the details associated with the set of distributed clustered systems identifies the services being executed by each node.

3. The method of claim 1, wherein, responsive to the node being a data node and responsive to the data node failing to reestablish connection to a master node, the method further comprises:

starting, by the automatic cluster recovery mechanism, a service components on the data node through one of a master node's services to reestablish connection with the data node's associated distributed clustered system.

4. The method of claim 1, wherein, responsive to the node being a master node and responsive to the master node failing to reestablish connection to an associated set of data nodes, the method further comprises:

sending, by the automatic cluster recovery mechanism, a request to each host system associated with each data node in the associated set of data nodes so that the data node is recreated or re-prepared.

5. The method of claim 1, wherein preparing each node in the set of nodes with respective components and configurations further comprises:

preparing, by the automatic cluster recovery mechanism, different volumes required for the node with at least one of metadata information, data information, or log directory information;

specifying, by the automatic cluster recovery mechanism, volume information and internet protocol (IP) ports used;

starting, by the automatic cluster recovery mechanism, each virtual machine or container associated with the node;

configuring, by the automatic cluster recovery mechanism, each virtual machine or container with peer details so that each virtual machine or container may communicate with associated virtual machines or containers; and starting, by the automatic cluster recovery mechanism, required prerequisite services.

6. The method of claim 5, further comprising:

responsive to the node being a master node, attaching, by the automatic cluster recovery mechanism, a portable internet protocol (IP) address to the master node.

7. The method of claim 5, wherein, responsive to the node being a master node, the required prerequisite service is a cluster manager and wherein, responsive to the node being a data node, the required prerequisite service is a cluster management agent.

\* \* \* \* \*